United States Patent [19]

Solberg

[11] 4,130,028
[45] Dec. 19, 1978

[54] PAWL-AND-RATCHET CATCH

[75] Inventor: Aasmund Solberg, Leirsund, Norway

[73] Assignee: Angel Mork, Gjerdrum, Norway

[21] Appl. No.: 805,102

[22] Filed: Jun. 9, 1977

[51] Int. Cl.² ............................................. G01H 3/12
[52] U.S. Cl. .................................... 74/577 R; 74/491; 74/523; 74/535; 160/302; 297/366
[58] Field of Search ................... 160/300, 302, 304; 297/366, 379, 367, 372; 74/577 R, 577 M, 577 SF, 576, 491, 523, 575, 535

[56] References Cited

U.S. PATENT DOCUMENTS

| 169,804 | 11/1875 | Hamblin | 74/577 S |
|---|---|---|---|
| 773,720 | 11/1904 | Drury | 74/535 |
| 777,745 | 12/1904 | Pavlish | 74/535 |
| 2,139,028 | 12/1938 | Mensendicck et al. | 297/372 X |
| 2,577,199 | 12/1951 | Klopner | 74/577 X |
| 3,186,253 | 6/1965 | Ramillon | 74/576 X |
| 3,352,580 | 11/1967 | Kurz et al. | 297/366 X |
| 3,368,847 | 2/1968 | Langmead | 297/366 |

FOREIGN PATENT DOCUMENTS

| 843212 | 5/1952 | Fed. Rep. of Germany | 74/501 |
|---|---|---|---|
| 1204467 | 11/1965 | Fed. Rep. of Germany | 74/575 |
| 1095140 | 5/1955 | France | 74/577M |
| 358289 | 12/1961 | Switzerland | 74/535 |

Primary Examiner—Leslie Braun
Attorney, Agent, or Firm—Young & Thompson

[57] ABSTRACT

Pawl catch device for two reciprocally-rotating parts, for example for an awning. The first part has a spring-loaded pawl with a tongue to engage with teeth on a toothed sector provided on the second part. The second part also comprises a shaft about which the first part rotates. The teeth on the toothed sector are disposed at successively increasing distances from the shaft, and the pawl is adapted to catch automatically in any of a plurality of angular positions, such that when the two parts are rotated back toward the starting position, the tongue passes clear of the top of that tooth with which it has just been engaged. The pawl is held by spring force against the teeth in each of the catch positions.

2 Claims, 3 Drawing Figures

PAWL-AND-RATCHET CATCH

The present invention relates to a pawl catch device for two reciprocally-rotating parts, for example, for use with an awning, one part having a spring-loaded pawl whose tongue engages with ratchet teeth on a toothed sector provided on the second part, said second part also comprising a shaft on which the first part rotates.

Catches of the above type are used in a number of applications, for example, for regulating the support rods of an awning relative to the wall mounting, for adjusting the angle of the reclining back of a garden chair or lounge, or for regulating the flap on a simple air valve.

The disadvantage of previous pawl catches of this type is that it has not been possible to bring the part which has been locked relative to the other part by means of the pawl back to its starting position without first rotating it completely past the toothed sector, so that the pawl tongue disengages. This disadvantage is particularly manifest where repeated adjustments of one part relative to the other are required or desirable. This is the case, for example, for garden chairs and especially for chaise longues, recliners or camping beds. On a conventional camping bed or recliner, one cannot adjust the back from a sitting position to a reclining position without first pivoting the back forward almost completely down to the seat. This is troublesome, since one must rise from the lounge in order to perform the movement. Conventional awning mountings also have this drawback.

The purpose of the present invention is to provide a pawl catch device which avoids the above drawback, where from any catch position one is able to bring one part to its starting position without first having to rotate the first part so far, relative to the second part, that the pawl is guided past the last tooth on the toothed sector, and from there, back to the initial position.

This is achieved according to the invention with an improved pawl catch device of the type described introductorily, the device being characterized in that the teeth on the toothed sector are disposed at successively increasing distances from the shaft, in that the pawl is adapted to catch automatically in any of a plurality of angular positions, such that when the two parts are rotated back toward the starting position, the tongue on the pawl passes clear of the top of the tooth with which it has just been engaged, and in that the pawl, in a manner known per se, is held by spring force against the teeth in each catch position.

A preferred embodiment of the pawl catch of the invention is characterized in that a plurality of radially-extending notches are disposed at an angular distance from the tongue of the pawl, these notches being adapted to engage with an auxiliary pawl which also is pivoted on the first rotatable part and is spring-loaded in a central direction toward the notches, said auxiliary pawl in the starting position holding the pawl tongue by spring force against the first tooth on the toothed sector, but with further rotation of the two rotatable parts, the tongue of the pawl will impinge on the next tooth and the pawl will be pivoted, such that the auxiliary pawl will click into the next notch on the pawl, and thus the pawl will be held in an angular position whereby a reversal of the direction of rotation for the two parts will cause the tongue to bypass the top of the first tooth, but if the initial direction of rotation continues, the tongue will be held by spring force against the next tooth. A practical embodiment of the auxiliary pawl has the form of a two-armed lever rotatable about a shaft, one arm being adapted to engage with the notches on the pawl, and the other arm being connected by a radial tension spring to a point on the first rotatable part.

The invention will be explained in more detail in the following with reference to the figures, which illustrate an embodiment of the pawl catch of the invention as used in connection with a mounting for an awning.

Figure 1:
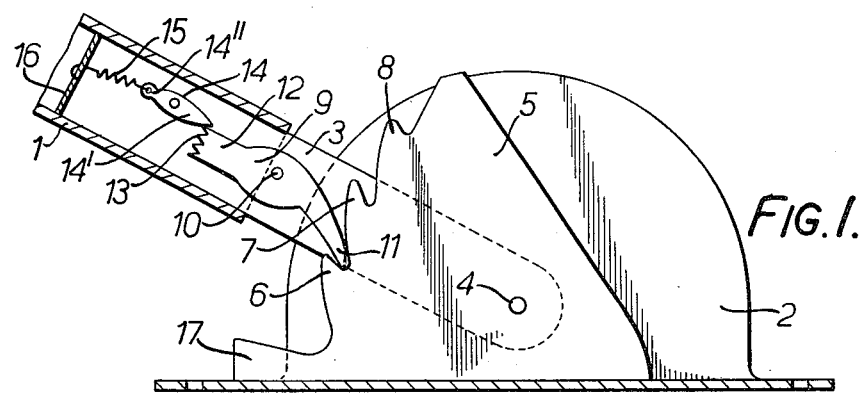
FIG. 1 shows the pawl catch engaged with the first tooth on the toothed sector.

The two parts which are to be rotated relative to one another are in this case a support arm 1, of which only a small section is shown, and a bearing housing or mounting 2 which is adapted to be fastened onto a wall. A forked extension 3 is attached to the end of the arm 1, said forked extension rotating about a shaft 4 on the mounting 2. A toothed sector 5, made of plastic, for example, is also fastened to the mounting 2. The toothed sector has three ratchet teeth, 6, 7 and 8, which, in the order mentioned, are disposed at successively increasing distances from the shaft 4. Supported between the legs of the fork 3 is a pawl 9 which pivots about a shaft 10 and has a catch tongue 11. On the end opposite its tongue 11, the pawl has an extension 12 with a plurality of notches 13 which are directed away from the center of rotation 10 of the pawl. In connection with the extension 12, an auxiliary pawl 14 is provided, having a detent arm 14' cooperating with the notches 13 and an oppositely-directed arm 14". A tension spring 15 is attached to the arm 14", the other end of the spring being fastened to the stem 16 of the fork.

Figure 2:
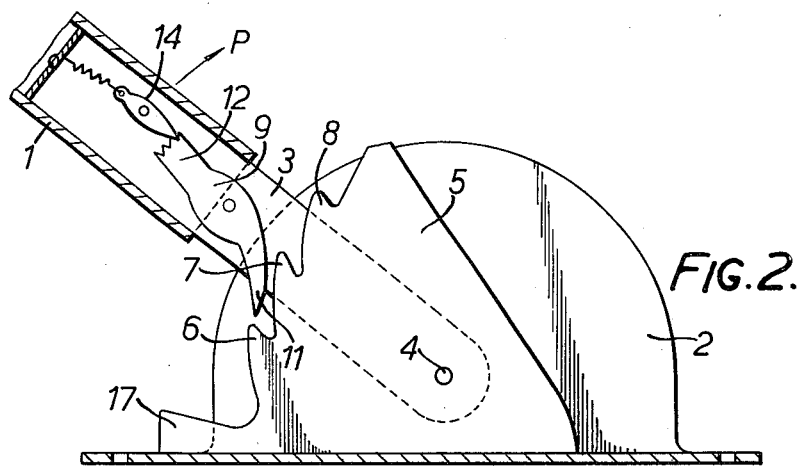
FIG. 2 shows the pawl device of FIG. 1 when it has been rotated further, so that the pawl tongue now is in contact with the top of the second tooth.
Figure 3:
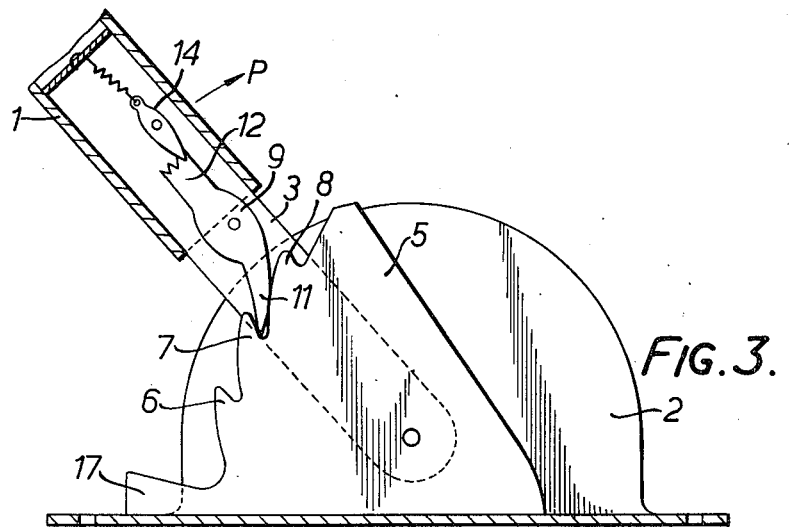
FIG. 3 shows the pawl device of FIGS. 1 and 2 with its tongue engaged with the second tooth on the toothed sector.

When the pawl is in the position shown in FIG. 1, the detent arm 14' on the auxiliary pawl 14 is in contact with the upper edge of the extension 12 on the pawl 9 and has pressed the pawl tongue 11 into engagement in back of the first tooth 6 on the toothed sector 5. Then, when the arm 1 is rotated in the direction of the arrow P, the tongue 11 on the pawl 9 will be pressed further in a clockwise direction because the tooth 7 lies at a greater distance from the center of rotating 4 than the tooth 6, and the detent 14' on the auxiliary pawl will click into the first of the notches 13 on the extension 12 of the pawl 9. The pawl 9 will thus be locked into an angular position, such that the outer end of its tongue 11 will bypass the outer edge of the tooth 6 should the arm be rotated in the reverse direction of the arrow P (FIG. 2). However, if the arm 1 is pivoted further in the direction of the arrow P, the spring effect of the spring 15 will force the tongue 11 to click into place in back of the tooth 7 (FIG. 3). The same thing will occur if the arm 1 is guided even further in the direction of the arrow P. The tongue 11 will then come up against the outer surface of the tooth 8 and will be caused to rotate further in a clockwise direction, such that the detent arm 14' on the auxiliary pawl 14 will jump into the next notch 13 on the pawl extension 12, and the outer end of the tongue 11 would then be clear of the top of the tooth 7 if the arm 1 were rotated in the reverse direction of the arrow P. If the arm 1 has been rotated so far that the tongue 11 has clicked into place in back of the tooth 8, the arm 1 can be rotated back by first pivoting the arm in the direction of the arrow P, such that the detent arm 14' on the auxiliary pawl engages with the last of the notches 13. This forces the pawl 9 to turn in a clockwise direction, such that the outermost end of the tongue 11 will pass clear of the top of the tooth 8 when the arm 1 is rotated in the reverse direction of the arrow P. When the arm has been rotated down as far as it can go in the reverse direction of the arrow P, the tongue 11 on the pawl 9 will come up against a projection 17 which forces the pawl 9 to pivot in a counterclockwise direction, and the auxiliary pawl 14 will then flip up to assume the position shown in FIG. 1. The tongue 11 can then be guided into engagement with any of the teeth 6, 7, 8 through a new movement of the arm 1 in the direction of the arrow P.

In the example discussed above, the invention has been described in connection with its application as a mounting for an awning, but the pawl catch device of the invention can be used equally well for various other purposes, for example, for adjusting the reclining angles on a chaise longue, recliner, camping bed or the like. The number of teeth and the angle of the toothed sector can be changed, such that the angle of deflection for the two adjustable parts can be increased.

Having described my invention, I claim:

1. A pawl catch device comprising two relatively rotatable parts, the first part having a main pawl pivotally mounted thereon with a tongue that engages with the teeth on a toothed sector on the second part, said second part having a shaft about which the first part is rotatably secured, the teeth on the toothed sector being disposed at successively increasing distances from the shaft, the main pawl being adapted to catch automatically in any of a plurality of angular positions in engagement with successive ones of said teeth, said main pawl having a plurality of radially extending notches therein, an auxiliary pawl pivotally mounted on said first rotatable part, spring means urging said auxiliary pawl toward said notches, said teeth and auxiliary pawl being so positioned relative to each other that movement of said tongue from tooth to tooth along said toothed sector in the direction in which the distances of said teeth from said shaft successively increase causes said auxiliary pawl to move from notch to notch on said main pawl whereby said main pawl is held by said auxiliary pawl in such an angular position that upon reversal of the direction of rotation of the parts relative to each other, said main pawl will bypass the top of the teeth of lesser height that have been passed by said main pawl.

2. A device as claimed in claim 1, said auxiliary pawl having the form of a two-armed lever rotatable about a shaft on said first part, a first arm of said lever engaging with said notches and a second arm of said lever being connected by a radial tension spring to a point on said first part.

* * * * *